April 22, 1969 J. CLASS 3,439,591
PROCESS AND MACHINE FOR THE MANUFACTURE OF BAGS
HAVING ATTACHED HANDLES
Filed Sept. 19, 1966 Sheet 2 of 6
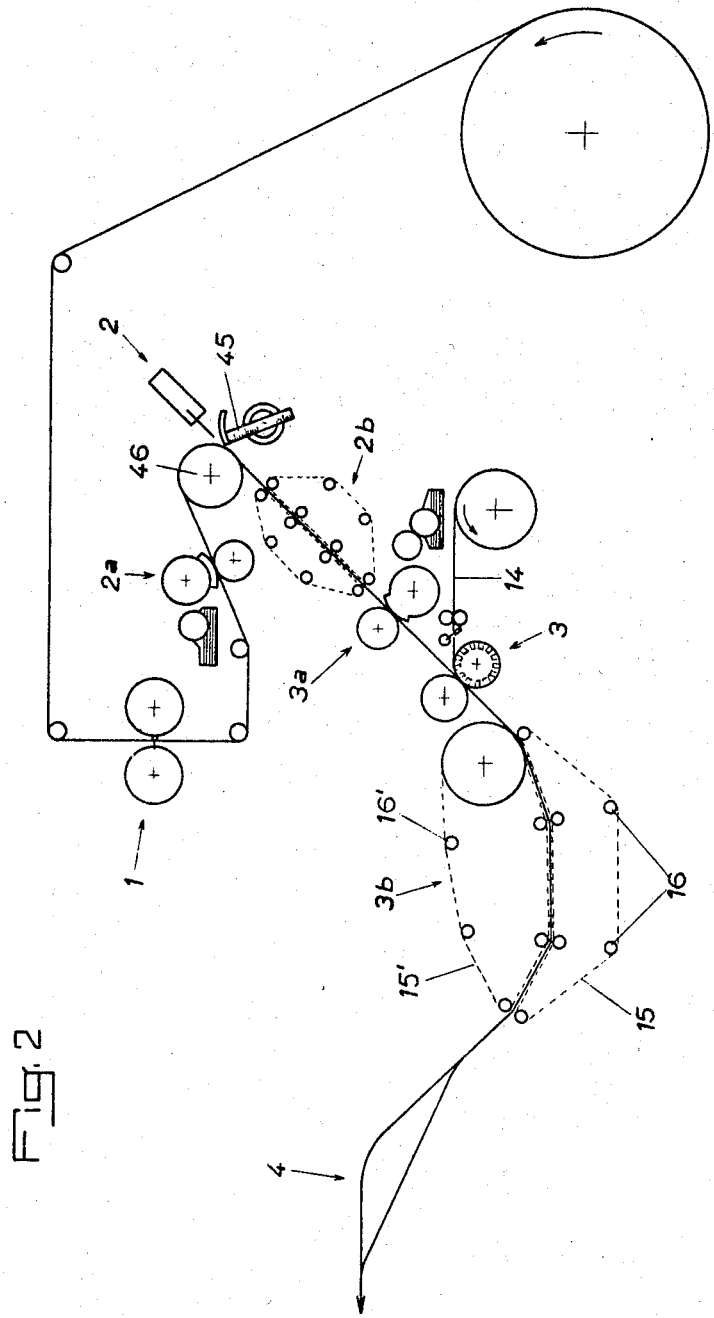

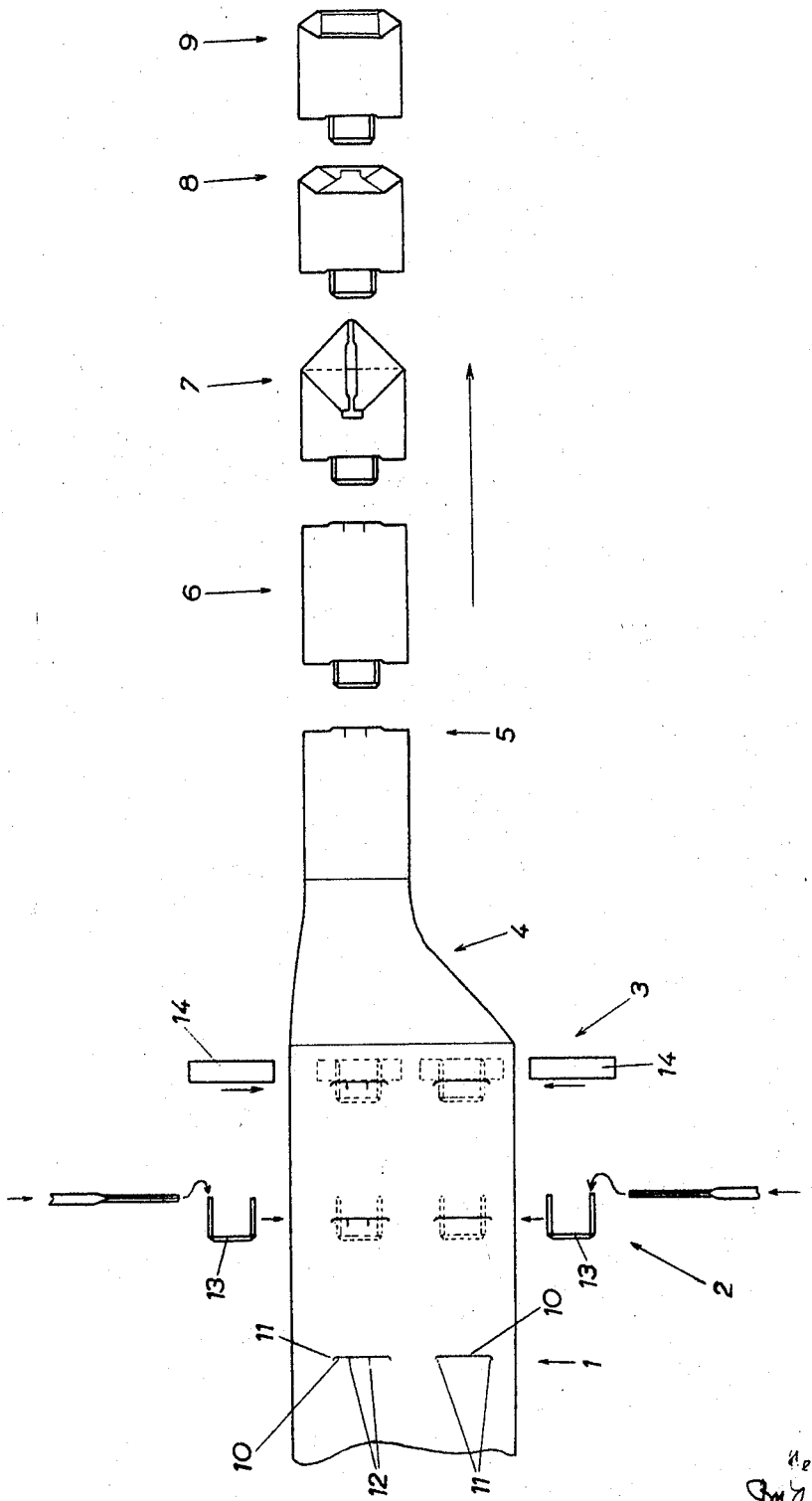

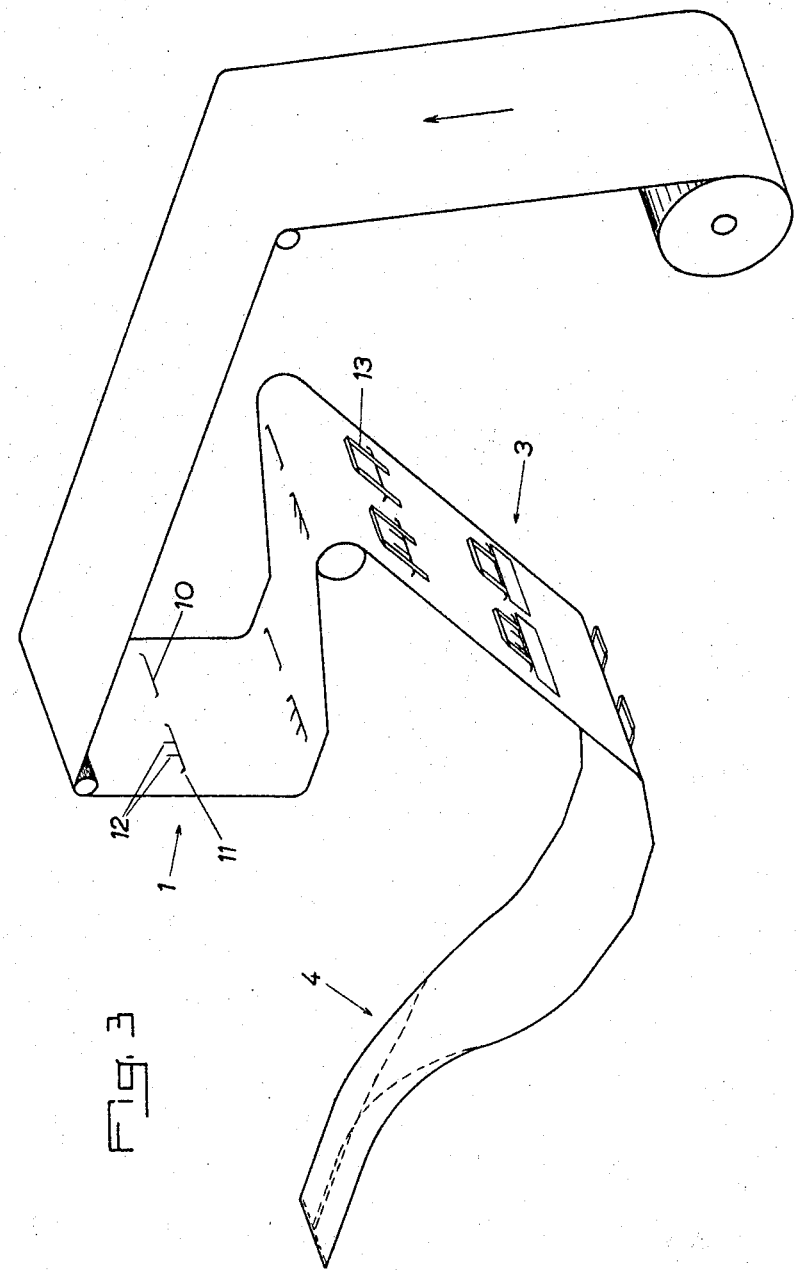

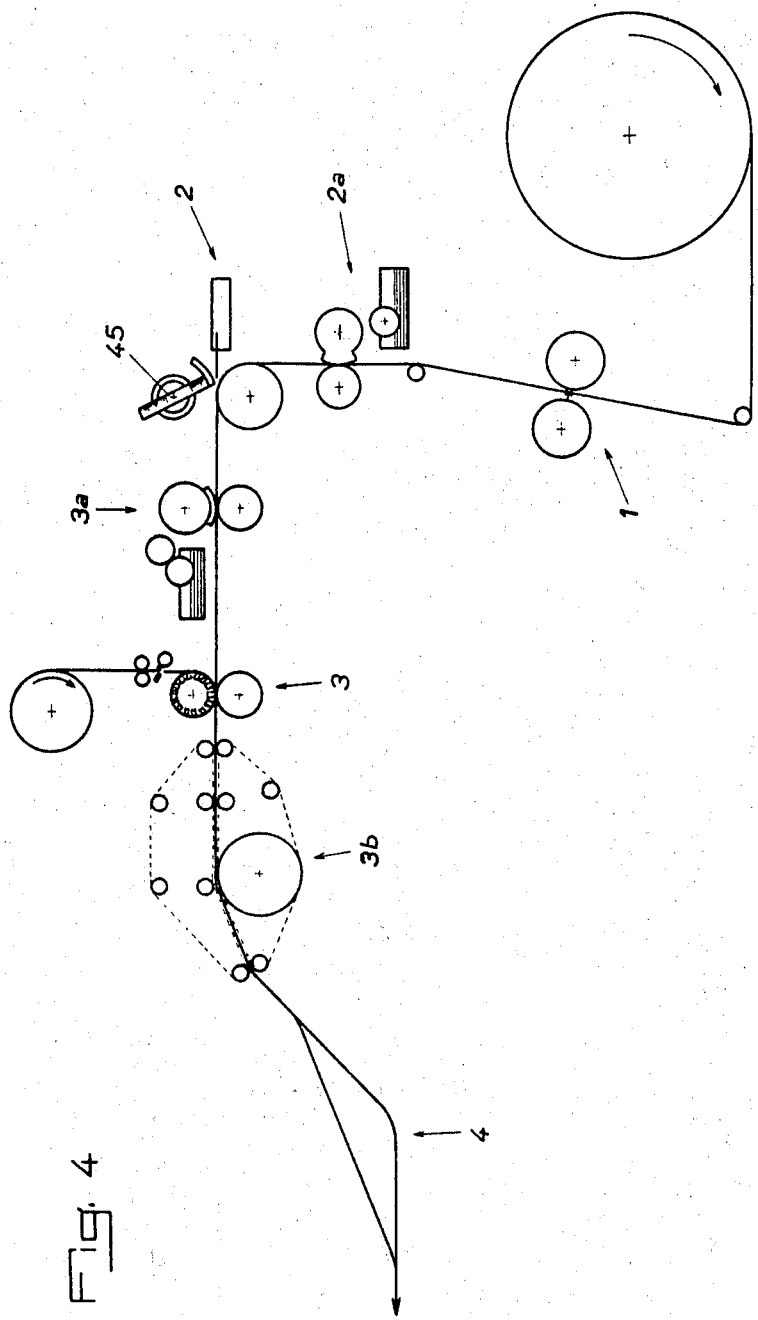

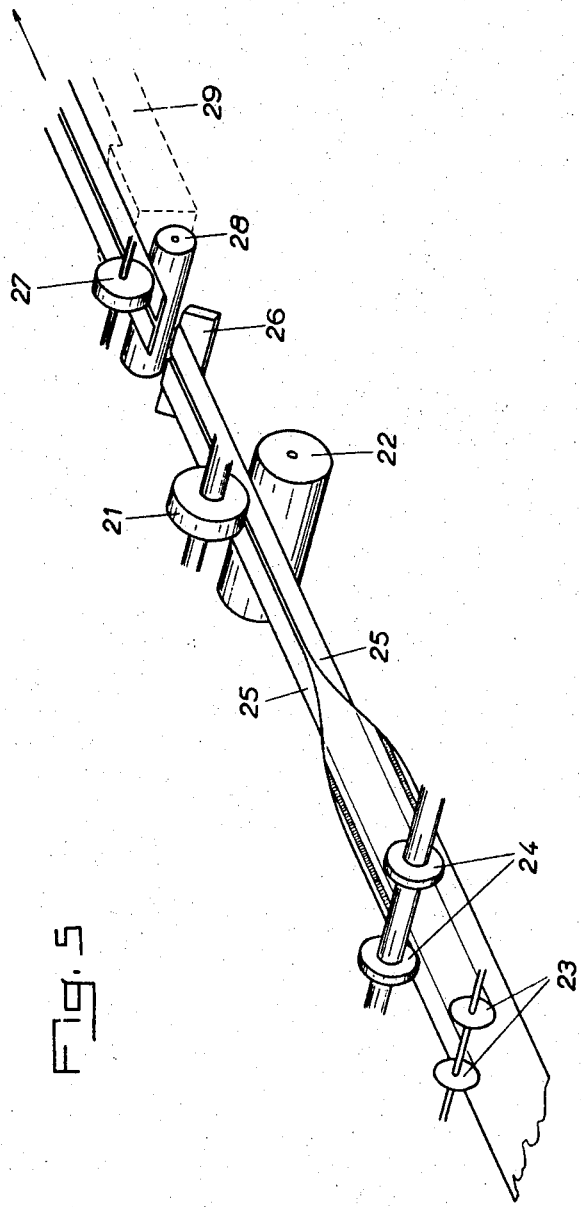

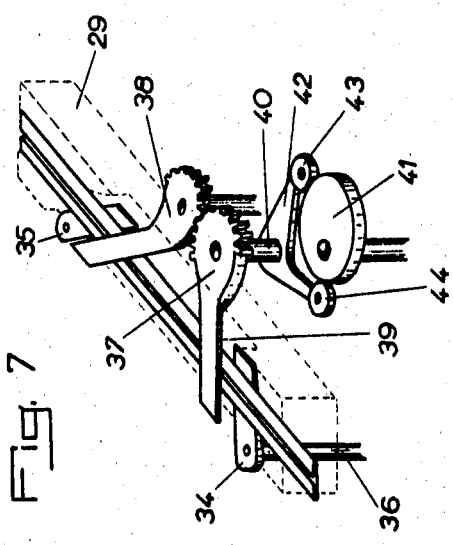
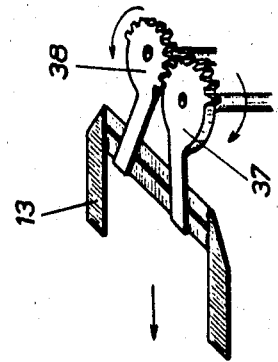
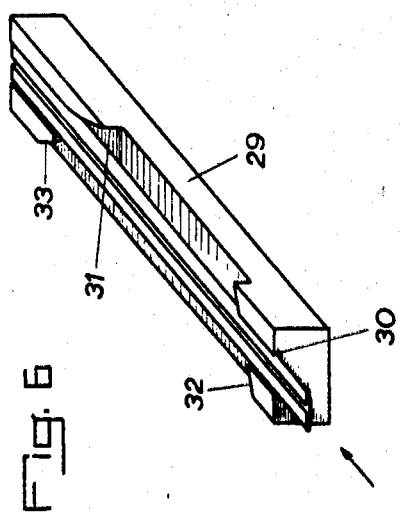
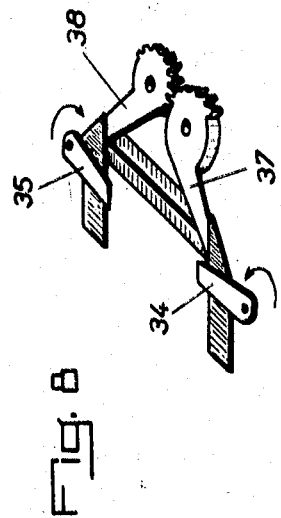

United States Patent Office 3,439,591
Patented Apr. 22, 1969

3,439,591
PROCESS AND MACHINE FOR THE MANUFACTURE OF BAGS HAVING ATTACHED HANDLES
Jean Class, Strasbourg, France, assignor to Les Ateliers de Constructions Mercaniques C. & A. Holweg, S.A.R.L., Strasbourg, Bas-Rhin, France, a corporation of France
Filed Sept. 19, 1966, Ser. No. 580,405
Claims priority, application France, Sept. 23, 1965, 8,418
Int. Cl. B31b 49/04, 1/00
U.S. Cl. 93—35                    1 Claim

ABSTRACT OF THE DISCLOSURE

The present invention relates to a bag having attached handles, and to a process for the manufacture thereof.

It is known that very numerous designs exist for bags having carrying handles, and that certain machines have been designed and executed for the manufacture thereof.

These portable bags are in general distinguished by their handles, of which two principal categories exist: the handles of the string type having an approximately circular section, and flat handles of paper.

The two types of handles possess their advantages and their drawbacks, and in particular the flat paper handles have the advantage of a more aesthetic appearance, of not hurting the hands, and that they can easily be stuck to the bags by reason of their large flat surfaces.

Moreover packs of bags having flat handles of paper, formed for the purpose of their storage or their dispatch to the user, are more easily handled, since there is no danger of the handles being entangled.

Up to the present such bags are manufactured in two distinct operations, the first consisting in completing the bag, the second in depositing a handle, on a special machine. Thence it immediately results that it is practically impossible to glue such handles to the interior of the bag walls. Therefore the bags which it is thus possible to manufacture mechanically all appear with the handles stuck to the exterior, which is detrimental to their good appearance, especially since as a general rule the bags are completely printed for publicity purposes.

It is one object of the present invention to provide a process permitting the manufacture of a bag with handles in one single operation and irrespective of its format and, starting from this possibility, of producing a novel type of bags comprising two flat handles of paper stuck to the interior walls of the bag with reinforcing strips which prevent unsticking of the handles when manipulated by the user.

It is another object of the present invention to provide a process for the manufacture of bags with attached handles which comprises the forming of two slots in the strip of bag material unwinding from a reel, disposed perpendicularly to the unwinding direction, in depositing upon the strip, transversely and on either side of the slots, the handles each formed by a narrow strip folded upon itself and cut and with the two end strands folded through 90° in its plane, in pressing the strands upon the material strip previously glued in the regions. This is brought about by folding the strip to form a conventional tube, in cutting off the tube to separate the unslotted parts in line with the slots, in accelerating the tubular section in order to disengage the handles completely from the following section, and in terminating the formation of the bag by folding the bottom and depositing the bottom-reinforcing strip. A reinforcing strip is provided for the handles in the case of sticking of the handles to the interior being deposited and stuck on the strip before the formation of the tube.

It is still another object of the present invention to provide a machine which carries out the continuous execution of the various successive operations according to the process for the manufacture of bags with attached handles, block-bottomed bags, flat bellows-fold bags, square-bottomed bags, with external handles or with internal handles stuck between the outer wall and the lining in the case of lined bags, or finally with internal handles with a reinforcing strip, the machine comprising mechanical devices known per se for continuous unwinding of the strip of bag material, for cutting off and slotting the strip, for sticking, for application of a reinforcing strip, for formation of the conventional tube, for cutting off, separating the sections and for formation of the bag bottom, which devices are utilised in judicious fashion in co-ordination with a novel mechanical apparatus for the manufacture of the handles and their placing on the strip, two identical devices being disposed side by side and working simultaneously, the whole of the machine manufacturing handled bags in one continuous operation and permitting manufacture in different formats, in length or width.

Finally, it is also one object of the present invention to provide bags with flat paper handles stuck internally, with a reinforcing strip.

The particular features of the present invention will be set forth in the course of the following description of the principle of manufacture of bags with attached handles, for example a block-bottom bag, and of the machine effecting the continuous manufacture thereof, and especially for bags with internal handles with a reinforcing strip, even in formats differing in length or width, given by example with reference to the accompanying drawings, in which:

FIG. 1 is a schematic showing of the succession of the operations to be carried out for the manufacture of a bag having attached handles, which handles are stuck internally with a reinforcing strip, and the bag being of the block-bottom type;

FIG. 2 is a diagrammatic profile view showing the principles of the arrangement of the various elements of the machine for the continuous manufacture of the bag with internal handles, for the formation of the conventional tube from beneath;

FIG. 3 is a perspective view of the progress of the paper strip, referring to FIG. 2;

FIG. 4 is a view analogous with FIG. 2, for the formation of the tube from above; and FIGS. 5 to 9 are perspective views of the various elements of the apparatus for the manufacture of the flat paper handles.

Referring now to the drawings, the principle of the manufacture of bags having attached handles is represented diagrammatically for a block-bottom bag.

In a first operation station 1, the strip of bag material rceeives two slots 10 perpendicular to its unwinding direction and situated in space at such a point that the handles 13 will be distributed on either side of this cutting; these straight slots 10 are terminated by small oblique slots 11, the use of which will be defined with reference to the station 5, and which are shown in FIG. 3. Moreover one of the slots can receive two small perpendicular slots 12 to give rise to a tab on the occasion of the operation of opening of the bag bottom.

At the station 2 a narrow material strip, coming from a reel, preferably of stout and possibly crimped paper, is folded upon itself to make a handle 13, by means of the apparatus according to the present invention which will be described hereinafter. This handle is deposited on the paper strip which is previously glued at the station 2*a* (FIG. 2).

The same operation is effected on both sides of the strip, which necessitates the provision of two identical apparatuses disposed side by side.

At the station 2*b* a train of straps effects the pressing of the handles 13 on the strip. It should be noted that this pressing is no longer necessary in the case where the tube is formed from above (FIG. 4), the handles being supported by the paper strip.

In a subsequent station 3 a small strip of strong paper or light cardboard 14 is deposited on the handles 13 and on the paper strip, which were previously glued at the station 3*a*. At 3*b* a train of straps 15, 15' and rollers 16 and 16' effects the pressing of the assembly of the handles 13 and the reinforcing strip 14, so that in the course of the subsequent manufacturing and especially in the formation of the tube their position may be already sufficiently ensured, so that there is no danger of displacement of the handles, which would lead to the production of a defective product.

At the station 4 the material strip is folded to form the tube. After this folding the two handles, the two reinforcing srips and the two transverse slots 10 must coincide exactly, the handles then being situated inside the tube, in the case under consideration.

The future bags are thus already materialised, but they are still held to one another by the strips of material situated to the right and the left of the handles. At the station 5 the various tube sections are cut apart by a knife device which effects the separation of the unslotted parts of the tube. Since it is difficult to make the straight cuts effected at the station 1 coincide with the cut effected at the station 5, oblique slots 11 have been provided at the station 1 which permit of compensating for a variation of position, without impairing the appearance of the bags.

At the station 6 the tube section is accelerated to disengage the handles completely from the following section, since if this were not so it would be impossible to open the bottom of the bag. This opening is effected at the station 7, and at the station 8 the two points of the bag are turned down and stuck. At the station 9 the bag receives a bottom-reinforcing strip, which increases its firmness.

The existing bag machines utilise the formation of the conventional tube either upwards or downwards, and for this reason FIG. 4 has been provided, with omission of the pressing device 2*b*.

By incorporating the apparatus for the formation and positioning of the handles, which will be described hereinafter in all existing bag machines, it is possible to obtain the types of bags mentioned above either with exterior handles, like conventional bags, or with interior handles with reinforcing strip.

The block-bottom bag with interior handles with a reinforcing strip is illustrated, and its manufacture described, in FIGS. 1 to 4. The lined block-bottom bag having handles stuck between the exterior paper and the lining is manufactured according to the same procedure, but the lining acts as reinforcing strip and the slots obtained at the station 1 must be cut simultaneously in the exterior paper and in the lining. Once this operation has been effected, the two papers are separated, so as to permit the sticking of the handles on the exterior paper, on which the lining is stuck at the station 3. For the conventional block-bottom bag having externally attached handles, the apparatuses of the stations 2 and 3 are disposed in such manner, that the handles and the reinforcing strip are deposited upon the upper surface of the strip. It should be noted that the machine for manufacturing bags with attached handles which continuously carries out the various operations of execution of the principle of manufacture, which is the object of the present invention, permits of manufacturing such bags in different formats in length or width on the same machine, which constitutes an advantage of great value. If in fact there exist certain types of machines which manufacture handled bags continuously, incidentally solely for string-type handles, they are of the "fixed-format" type.

The apparatus for forming and applying the flat paper handles, which is an object of the present invention, is composed of a plurality of mechanical elements which are illustrated by FIGS. 5 to 9. It is intended that this apparatus should be incorporated in the station 2 for the constitution of the machine for the manufacture of the bags with attached handles according to the present invention in co-ordination with the other devices according to the manufacturing principle, as described above and illustrated, which devices are known per se and judiciously utilised, notably the cutting-off and slotting device 1, the sticking devices 2*a* and 3*a* and the device for the application of a reinforcing strip 3, which permit a variation of the length of the bag without difficulty—this apparatus comprising two devices placed side by side and operating in perfectly identical manners.

FIG. 5 is a perspective view showing the folding of the paper strip intended to become a handle 13. A paper strip of appropriate width, coming from a reel (not shown), is drawn by means of a drive device composed of a roller 21 and a roll 22 at such a speed that the total length of one handle is delivered during the formation of one bag. These formation mechanisms are known per se, but the manner of operation must be recalled.

When the strip is still open, it passes beneath a pair of tracer rollers 23 which make an imprint in the strip in order to facilitate its folding. A pair of glueing rollers 24 deposits two parallel traces of glue, permitting of glueing the turned-over parts 25 of the strip on the middle part, the lateral parts being folded by means of conventional plates of helicoidal form (not shown) known as "turners."

Cutting of the strip into sections is effected by a lower knife 26 and another, rotating, knife situated above the strip, which latter knife is not represented for reasons of clarity.

A drive device composed of a roller 27 and a roll 28 pushes the sectioned strip into a guide block 29.

This guide block 29 (FIG. 6) is characterised by two guide grooves 30 and 31, the groove 31 having a funnel-shaped entry. It is cut away so as to leave two plane vertical surfaces 32 and 33 at 45°. In the cutaway part the folded strip rests on the block without lateral guidance.

FIG. 7 shows the gripper device necessary for making the folds of the paper strip at 45° with the purpose of forming a handle. The device comprises two internal flaps 34 and 35 fixed on a circular spindle 36 in such manner as to permit their rotation. Moreover these grippers are given a vertical movement of slight amplitude by means of a device (not shown). The flaps 34 and 35, when they are in the rest position, fit into the block 29 and especially into the 45° chamfers 32 and 33. Their upper part does not protrude beyond the highest part of the block 29.

The interior flaps 37 and 38 each possess a 45° edge 39 which in the working position comes to place itself along the edges of the flaps 34 and 35. The two parts 37 and 38 are mounted on spindles and connected by a toothed sector.

The spindle 40 of one of the flaps is given an alternating movement obtained by means of a cam 41, a lever 42 and two rollers 43 and 44, which permit of ensuring a reciprocating motion without the use of springs.

The whole of this mechanism is also given a vertical movement of slight amplitude, especially by means of a cam device which is not represented.

The assembly operates in the following manner: when the folded strip advances in the recesses of the block 29, the flaps 34 and 35 occupy their lowest position, while the flaps 38 and 39 occupy their highest position. As soon as the strip is completely engaged and cut by the knife 26 working in conjunction with the rotating knife (not shown), the flaps 37 and 38 descend while at the same time the flaps 34 and 35 ascend.

Almost simultaneously a forward rotational movement is imparted to the flaps 34 and 35 so as to fold the two arms thus forming a handle, as shown in FIG. 8.

When this formation is effected, the cam 41 is subjected to a rotational movement causing the two flaps 38 and 39 to be put in the middle position, through the intermediary of the lever 42 and the rollers 43 and 44.

Simultaneously a segment conveyor device 45 (see FIGS. 2 and 4), given a uniform rotational movement and working in conjunction with a complete roll 46 which is surrounded by the paper strip, grasps the two free strands of each handle by means of the said segments and applies them therefore to the paper strip previously glued at the station 2a.

As has been specified, the machine, according to the present invention, permits of manufacturing bags of different lengths. Thus the apparatus for forming and depositing the handles is designed to be able to serve in the case of bag formats differing in length, this being so by reason of the special mechanical device used in the segment conveyor device 45.

This conveyor device must in fact rotate once per bag and it must have a circumferential speed corresponding to the speed of the unwinding strip. This is obtained by movement of the segment towards or away from its center, and especially by a rod which is graduated directly in bag lengths.

Since this segment is only a portion of a circle and it comes into contact with the handle at the moment when the latter is being formed, thus it is possible on the one hand to effect the turning over of the lateral parts of the handle without difficulty, since they drop into the vacant sector of the circle, and on the other hand to drive the handles forcibly at the speed of the paper when the segments come into contact with the handles on the one part and with the glued paper on the other part.

Finally it should be observed that the handle-forming apparatus can be conceived in two different manners, either in the form of a device integrated as specified into a bag machine which is to be designed, or even in the form of an independent and novel apparatus which it is possible to couple in accordance with known principles to existing bag machines, provided that their original technical conception is compatible with the manufacture of a bag having protruding handles.

I claim:

1. A process for the continuous manufacture of bags having attached flat paper handles, in one single operation and irrespective of their format, and especially of bags having handles stuck to their inner walls, with reinforcing strips, comprising the steps of
   forming transverse slots in a first strip of material for the bag unwinding from a reel,
   depositing handles in said slots on the face of said strip, forming said handles from a narrow second strip folded upon itself,
   cutting said second strip, folding two end strands of said second strip at 90° in the plane of said second strip,
   pressing said handles upon said first strip after gluing said second strip in prfedetermined zones thereof,
   depositing and sticking a reinforcing strip, over said handles and said first strip of material,
   folding said first strip of material to form a conventional tube,
   putting said handles and said reinforcing strips into exact superposition,
   cutting off said tube to separate its unslotted parts in line with said slots,
   accelerating said flattened tubular section, in order to disengage said handles completely from the following section of said tube, and
   folding the bottom of said tube.

References Cited

UNITED STATES PATENTS

| | | | |
|---|---|---|---|
| 2,689,506 | 9/1954 | Bagnall | 93—8 |
| 2,469,536 | 5/1949 | Winesett | 93—35 |
| 2,529,976 | 11/1950 | Strandberg | 93—35 |
| 2,952,396 | 9/1960 | Steen | 93—35 |
| 3,034,409 | 5/1962 | Finke | 93—35 |
| 3,040,633 | 6/1962 | Davis | 93—35 |
| 3,081,674 | 3/1963 | Steen | 93—35 |

FOREIGN PATENTS

| | | |
|---|---|---|
| 1,055,340 | 4/1959 | Germany. |
| 659,505 | 3/1963 | Canada. |

WAYNE A. MORSE, JR., *Primary Examiner.*

U.S. Cl. X.R.

93—8